(12) United States Patent
Yu et al.

(10) Patent No.: US 7,098,608 B2
(45) Date of Patent: *Aug. 29, 2006

(54) LOSSLESS CIRCUIT FOR SAMPLING OF LAMP VOLTAGE

(75) Inventors: Qinghong Yu, Salem, MA (US); Christopher Radzinkski, Huntsville, AL (US); Peter Shackle, Rolling Hills Estates, CA (US); John Jay Dernovsek, Madison, AL (US)

(73) Assignee: Universal Lighting Technologies, Inc., Madison, AL (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/004,668

(22) Filed: Dec. 3, 2004

(65) Prior Publication Data

US 2005/0168167 A1 Aug. 4, 2005

Related U.S. Application Data

(60) Provisional application No. 60/526,638, filed on Dec. 3, 2003.

(51) Int. Cl.
*H05B 37/02* (2006.01)

(52) U.S. Cl. ............... 315/291; 315/224; 315/307; 315/DIG. 7

(58) Field of Classification Search .......... 315/291, 315/224, 225, 307, 209 R, 105, 106, DIG. 2, 315/DIG. 5, DIG. 7
See application file for complete search history.

(56) References Cited

U.S. PATENT DOCUMENTS

| | | | | |
|---|---|---|---|---|
| 5,083,065 A | * | 1/1992 | Sakata et al. | 315/DIG. 7 |
| 5,436,529 A | | 7/1995 | Bobel | 315/106 |
| 5,444,336 A | * | 8/1995 | Ozawa et al. | 315/DIG. 5 |
| 5,493,180 A | | 2/1996 | Bezdon et al. | 315/106 |
| 5,500,576 A | | 3/1996 | Russell et al. | 315/307 |
| 5,636,111 A | | 6/1997 | Griffin et al. | 315/225 |
| 5,770,925 A | | 6/1998 | Konopka et al. | 315/225 |
| 5,945,788 A | | 8/1999 | Li et al. | 315/291 |
| 5,969,483 A | | 10/1999 | Li et al. | 315/224 |
| 5,982,106 A | | 11/1999 | Bobel | 315/209 R |
| 6,121,731 A | * | 9/2000 | Kanazawa et al. | 315/209 R |
| 6,127,786 A | | 10/2000 | Moisin | 315/291 |
| 6,169,369 B1 | | 1/2001 | Nerone et al. | 315/106 |
| 6,211,623 B1 | | 4/2001 | Wilhelm et al. | 315/224 |
| 6,259,215 B1 | * | 7/2001 | Roman | 315/307 |
| 6,316,887 B1 | | 11/2001 | Ribarich et al. | 315/307 |

(Continued)

OTHER PUBLICATIONS

European 0061730, Inui, Jun. 10, 1982.

(Continued)

*Primary Examiner*—Wilson Lee
*Assistant Examiner*—Ephrem Alemu
(74) *Attorney, Agent, or Firm*—Waddey & Patterson; Jason L. Hornkohl

(57) ABSTRACT

An electronic ballast has a resonant tank circuit that includes a tank inductor and a tank capacitor connected in series. Lossless sampling of the output voltage of the electronic ballast is achieved by monitoring the voltage across a sampling capacitor placed in series with the tank capacitor. A resistive and capacitive filter is used to filter the monitored voltage such that it can be accurately received by a microcontroller. A resistor is connected in series with the sampling capacitor to produce an open circuit output voltage control signal that is used by the microcontroller to limit the open circuit output voltage. A cable compensation circuit is utilized to minimize variations in the open circuit voltage due to the connecting and disconnecting of a cable to the ballast output terminals.

20 Claims, 2 Drawing Sheets

U.S. PATENT DOCUMENTS

| | | | |
|---|---|---|---|
| 6,424,101 B1 * | 7/2002 | Sabate | 315/291 |
| 6,501,225 B1 | 12/2002 | Konopka | 315/105 |
| 6,552,494 B1 | 4/2003 | Randazzo et al. | 315/106 |
| 6,936,973 B1 * | 8/2005 | Parra et al. | 315/224 |
| 2002/0105283 A1 | 8/2002 | Murakami et al. | 315/224 |
| 2003/0025464 A1 | 2/2003 | Konopka | 315/291 |

OTHER PUBLICATIONS

European 0576991, Matsuzawa et al, May 1, 1994.

* cited by examiner

LOSSLESS CIRCUIT FOR SAMPLING OF LAMP VOLTAGE

CROSS-REFERENCES TO RELATED APPLICATIONS

This application is a Non-Provisional Utility application which claims benefit of co-pending U.S. patent application Ser. No. 60/526,638 filed Dec. 3, 2003, entitled "High Input Voltage Microcontroller Based Instant Start Ballast" which is hereby incorporated by reference.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

Electronic ballasts are used to provide power to gas discharge lamps such as fluorescent lights. These ballasts often sense the voltage applied to the lamp to monitor the functioning of the lamp and ballast. To sense the lamp voltage with a microcontroller, prior art ballasts such as set forth in U.S. Pat. No. 5,925,990, sample the lamp voltage through a resistor connected in series with a resonant capacitor. The voltage across the resistor represents the current in a resonant inductor, which is in turn proportional to the voltage across the resonant capacitor. However, in order to fully utilize the resolution of the A/D converter of the microcontroller, the voltage drop across the resistor needs to be relatively high. As a result, more than 2 watts of power are typically consumed at the output of the resonant inverter which increases the required input power to the ballast. Therefore, since efficiency is very important in modern lighting designs, an improved method and apparatus for sensing lamp voltage that consumes less power is needed.

In some prior art ballasts, the voltage on the lamp voltage sensing resistor is also used to control the open circuit voltage during striking when no lamp is connected. To accomplish this, the pulse width of one or both switches of the half bridge is typically controlled. Controlling the pulse width controls the open circuit voltage indirectly by using inductor current to control the voltage on the capacitor. As a result, large open circuit voltage variations often result when external connections to the fixture, such as cables, add extra capacitance. In ballast implementations that can afford to use a large resonant capacitor and a small inductor, the open circuit voltage variation problem is generally not significant. However, potentially damaging hard switching or capacitive mode switching is often observed with this type of prior art open circuit voltage controlled ballast. Furthermore, the use of a large resonant capacitor makes the resonant tank difficult to design. As a result, these types of ballasts suffer from more conduction losses and/or hard switching during the striking of the lamp than do typical ballasts. Conduction losses and hard switching are undesirable in that they may ultimately cause the ballast to fail. A large resonant capacitor, with a striking voltage of two lamps across it, stores a substantial amount of energy. When the striking attempt occurs when there is no load, the striking energy is transferred to the resonant inductor and can saturate the inductor. The result is undesirable hard switching occurring during the striking. Even though a MOSFET can survive the high stress transients in ballasts with a 460V bulk voltage, hard switching is undesirable and should be avoided if possible since it may result in damage. Furthermore, for some types of ballasts, it is critically important to avoid hard switching due to their particular susceptibility to damage from transients. Thus, in many of the prior art ballasts, the resonant capacitor value is minimized and a cable compensation circuit is utilized to control the open circuit voltage such that it is constant with various lengths of connecting cables having varying amounts of capacitance. However, these circuits are often complex and decrease the efficiency while increasing the cost of the ballast. Therefore, an improved method and apparatus for sensing and controlling the open circuit voltage of a ballast is needed.

BRIEF SUMMARY OF THE INVENTION

A preferred embodiment of the present invention is directed toward an electronic ballast for producing an output voltage for igniting and powering gas discharge lamps connected between a pair of output terminals. The ballast includes a microcontroller for controlling the ballast. An inverter including a first and second transistor and a resonant tank having a tank inductor and a tank capacitor are also included. A sampling capacitor is connected in series with the tank capacitor and an output voltage of the electronic ballast is monitored across the sampling capacitor. A pair of snubber capacitors is provided to reduce turn off losses in the first and second transistors. One of the snubber capacitors is connected in parallel with the first transistor and the other of the snubber capacitors is connected in parallel with the second transistor. An extended dead time is created between gating signals of the first and second transistors to allow the snubber capacitors to discharge. An open circuit voltage control circuit is provided that controls the output voltage when a gas discharge lamp is not connected between the output terminals. The open circuit voltage control circuit includes a resistor connected in series with the sampling capacitor. A voltage across the resistor is used to trim a gating signal for at least one of the first and the second transistors. A cable compensation circuit is provided that limits variations in the output voltage due to cables being connected to the output terminals of the ballast.

Another embodiment of the present invention is directed toward an electronic ballast for providing an output voltage on a pair of output terminals for use in powering a gas discharge lamp. The ballast includes an inverter circuit having a first transistor and a second transistor. A lossless snubber circuit is used to reduce turn off losses in the inverter. A resonant tank having a tank capacitor is included. A sampling capacitor is connected in series with the tank capacitor. The output voltage of the ballast is monitored by monitoring a voltage across the sampling capacitor. A resistor and capacitor filter the voltage across the sampling capacitor such that it can be properly received by a microcontroller for analysis. An open circuit voltage control circuit controls a voltage across the output terminals of the electronic ballast when a gas discharge lamp is not connected between the output terminals. The open circuit voltage control circuit includes a resistor connected in series with the sampling capacitor. The electronic ballast further includes a cable compensation circuit for compensating for changes in the output voltage due to a cable being connected to the output terminals. The cable compensation circuit compensates for changes in the output voltage by altering gating signals of at least one of the transistors and, thereby, limiting fluctuations in the output voltage.

Yet another embodiment of the present invention is directed toward an electronic ballast having a pair of output terminals for providing power to gas discharge lamps. The ballast includes a microcontroller for controlling the ballast and a half-bridge inverter circuit having a pair of series connected transistors. A resonant tank circuit is connected between the series connected transistors. The resonant tank circuit includes a resonant inductor connected in series with a resonant capacitor. A sampling capacitor is connected in series with the resonant capacitor such that a voltage across the sampling capacitor is proportional to a voltage across the output terminals. The microcontroller monitors the voltage across the sampling capacitor. A resistive and capacitive filter filters the sampled voltage across the sampling capacitor before the sampled voltage is provided to the microcontroller. A resistor is connected in series with the sampling capacitor such that a voltage across the resistor is used to control an open circuit output voltage of the electronic ballast. An open circuit voltage control circuit produces a transistor gating signal based upon the voltage across the resistor that is used by gating logic to control the output voltage. A cable compensation circuit limits variations in the output voltage due to cables being connected to outputs of the ballast. The cable compensation circuit also limits variations in the output voltage by providing signals to the microcontroller that are used to alter the turn-on times of at least one of the pair of transistors.

DETAILED DESCRIPTION OF THE INVENTION

Figure 1:
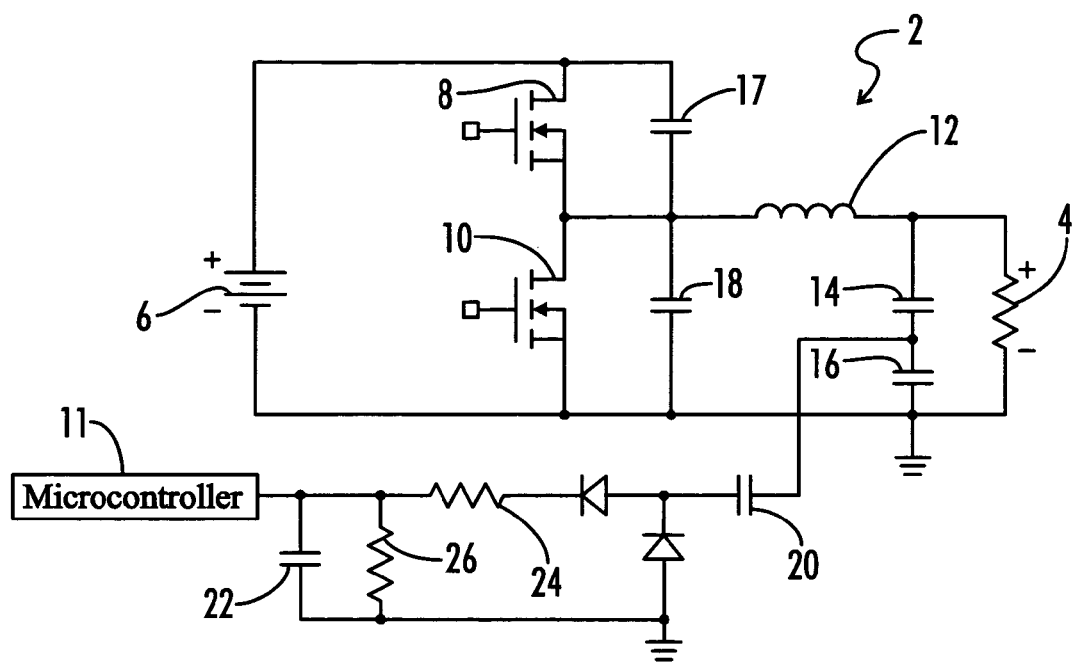
FIG. 1 is a schematic diagram of a lossless lamp voltage sampling circuit for an A/D converter of a microcontroller constructed in accordance with a preferred embodiment of the present invention.

A preferred embodiment of the present invention is directed toward an instant start electronic ballast for a gas discharge lamp that overcomes the aforementioned deficiencies of the prior art. Referring now to FIG. 1, an electronic ballast 2 that utilizes lossless sampling of the lamp voltage 4 in accordance with a preferred embodiment of the present invention is shown. The electronic ballast 2 includes a bulk DC voltage source 6 that provides power to the inverter circuit transistors 8 and 10 each of which is connected in parallel with a respective snubber capacitor 17 and 18. In the normal case, the capacitors 17 and 18 reduce the turn-off losses associated with the switches 8 and 10. However, all of the energy stored in the capacitors 17 and 18 when the switches 8 and 10 are turned off will be dissipated on the switches 8 and 10 at the turn-on. Thus, in a preferred embodiment such as an IHRV ballast, an extended dead time that allows the capacitors 17 and 18 to discharge is created between the gating signals of the transistors 8 and 10 to deal with this problem. Since the load current flowing through the lamp 14 is highly inductive during this extended dead time, the load 14 current will discharge the snubber capacitors 17 and 18 during the extended dead time.

The series resonant tank is comprised of a resonant tank inductor 12 and a resonant tank capacitor 14. Prior art circuits use a resistor connected in series with the resonant capacitor 14 to sense the lamp voltage 4 and control the open circuit voltage. However, in a preferred embodiment of the present invention for an Instant-Start, High Range Voltage (IHRV) ballast and/or sign ballast, the lamp voltage 4 is sensed by a sampling capacitor 16 that is connected in series with the resonant capacitor 14 as shown in FIG. 1. Using the principle of voltage division with capacitors, when the sampling capacitor 16 is much smaller than the resonant capacitor 14, the voltage drop on the sampling capacitor 16 is very large compared to resonant capacitor 14. This is beneficial in that it is relatively easy to find a film capacitor 16 that satisfies these criteria, has a small package size and is inexpensive. Moreover, the creation of large voltage drop across capacitor 16 provides a wide voltage range for the voltage sampling such that the full range of the A/D converter of the microcontroller 11 can be utilized. Most preferably, the capacitor 16 is a 330 nF 60V or a 680 nF 60V capacitor. A sampling circuit comprised of capacitors 20 and 22 and resistors 24 and 26 is used to condition and filter the sampled voltage on capacitor 16 for processing by the microcontroller. The sampling circuit of FIG. 1 provides a low output impedance, strong signal with an excellent signal to noise ratio and a quick response time to an A/D converter input of an associated microcontroller 11. More importantly, since the sampling is accomplished across the capacitor 16, the sampling process is substantially lossless and does not significant decrease the efficiency of the ballast 2. Thus, the circuit of FIG. 1 uses lossless capacitor based voltage division to improve the efficiency of the ballast 2 without sacrificing performance.

Figure 2:
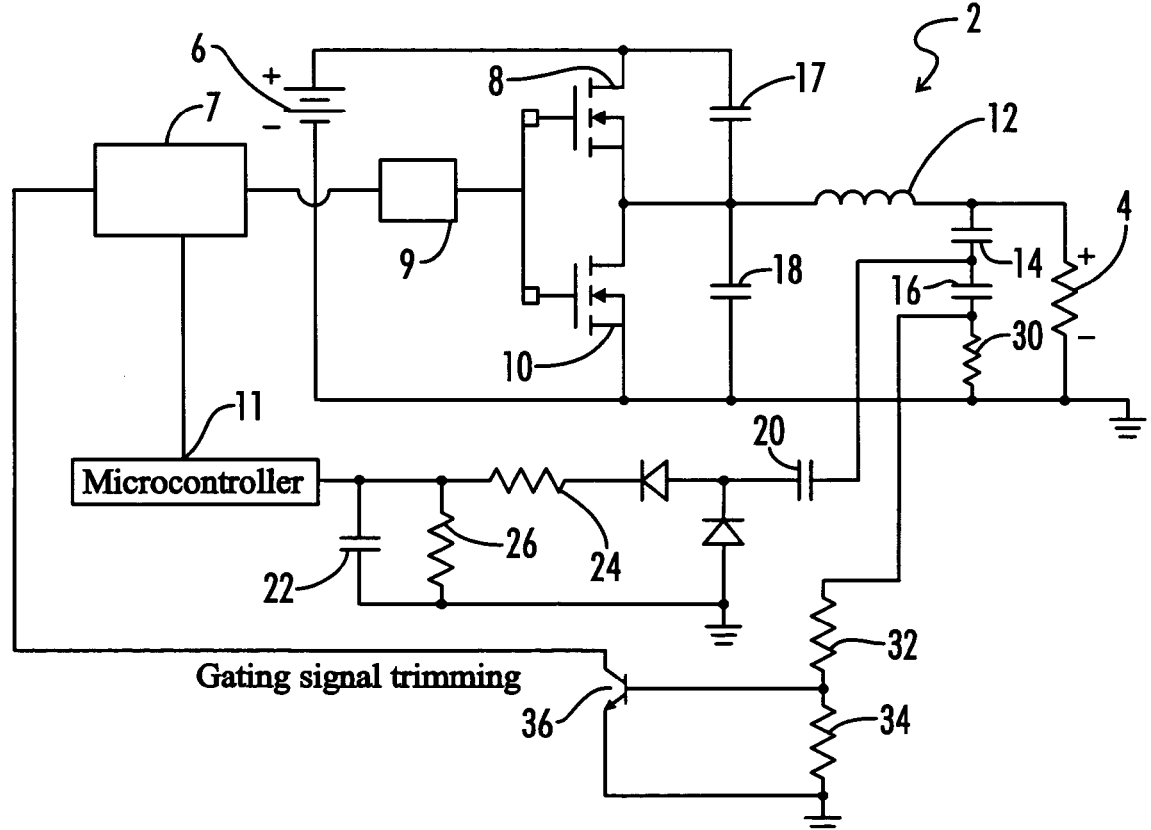
FIG. 2 is a schematic diagram of a lossless lamp voltage sampling circuit having open circuit voltage control circuitry constructed in accordance with an embodiment the present invention.

The sampling capacitor 16 used in the ballast of FIG. 1 can also be connected in series with a low value resistor 30, which can be used to control the open circuit voltage 4, as shown in FIG. 2. The hybrid sampling circuit shown in FIG. 2 samples a large amplitude version of the lamp voltage 4 across capacitor 30. The sampled signal is smoothed by RC filters constructed from capacitors 20 and 22 and resistors 24 and 26 and then fed to the A/D converter of the microcontroller. The response time of the sampled lamp voltage 4 is not fast, but it is almost entirely lossless. For open circuit voltage control, the amplitude of the voltage across resistor 30 is large enough at lamp striking to turn on transistor 36 and activate the gating logic 7 to trim the pulse width of the gating signal generated by the half-bridge driver 9 for the upper switch 8 of the half bridge. The exact value at which such gate signal trimming will occur is determined by the value of the resistors 32 and 34 which control the turning off and on of transistor 36. Most preferably, resistors 32 and 34 both have a value of 1 kΩ. Trimming the pulse width of the gating signal of the upper switch 8 limits the open circuit voltage 4. However, during steady state operation, the voltage on the resistor 30 is very small, out of phase with the voltage on capacitor 16, and still proportional to the lamp voltage 4. Hence, lamp voltage sensing is not affected by the resistor 30 when the ballast 2 is operating in the steady state.

The sampling circuit described above with respect to FIG. 2 can be used independently with or without a cable compensation circuit. Since the voltage on resistor 30 is in phase with the current of the upper switch 8, it is convenient to use the voltage on resistor 30 to control the open circuit voltage 4 when no lamp is connected and to trim the pulse width of the upper switch 8 of the half-bridge as discussed above. However, when a long cable is connected and the capacitance of the cable is essentially in parallel with the resonant capacitor 14, the parameters of the resonant tank constructed from inductor 12 and capacitor 14 changes. As a result, the open circuit voltage 34 decreases when a cable is connected to the ballast 2. When the value of the resonant capacitor 14 is small, the decrease in the open circuit voltage 34 is significant and the ballast will not strike the lamp. The open circuit voltage 4 can be set high to start a lamp with a long cable. However, in applications where no cable is attached, the open circuit voltage 4 will then be too high, which may cause the ballast to fail the through-lamp leakage test, or damage the sampling film capacitor 16. Increasing the capacitance of the resonant capacitor 14 helps to decrease the variation of the open circuit voltage but increases the conduction losses due to the circulation currents in the resonant capacitor 14. Furthermore, larger capacitor values lead to saturation of the resonant inductor 12. Therefore, the most preferred embodiments of the present invention include a cable compensation circuits.

Figure 3:
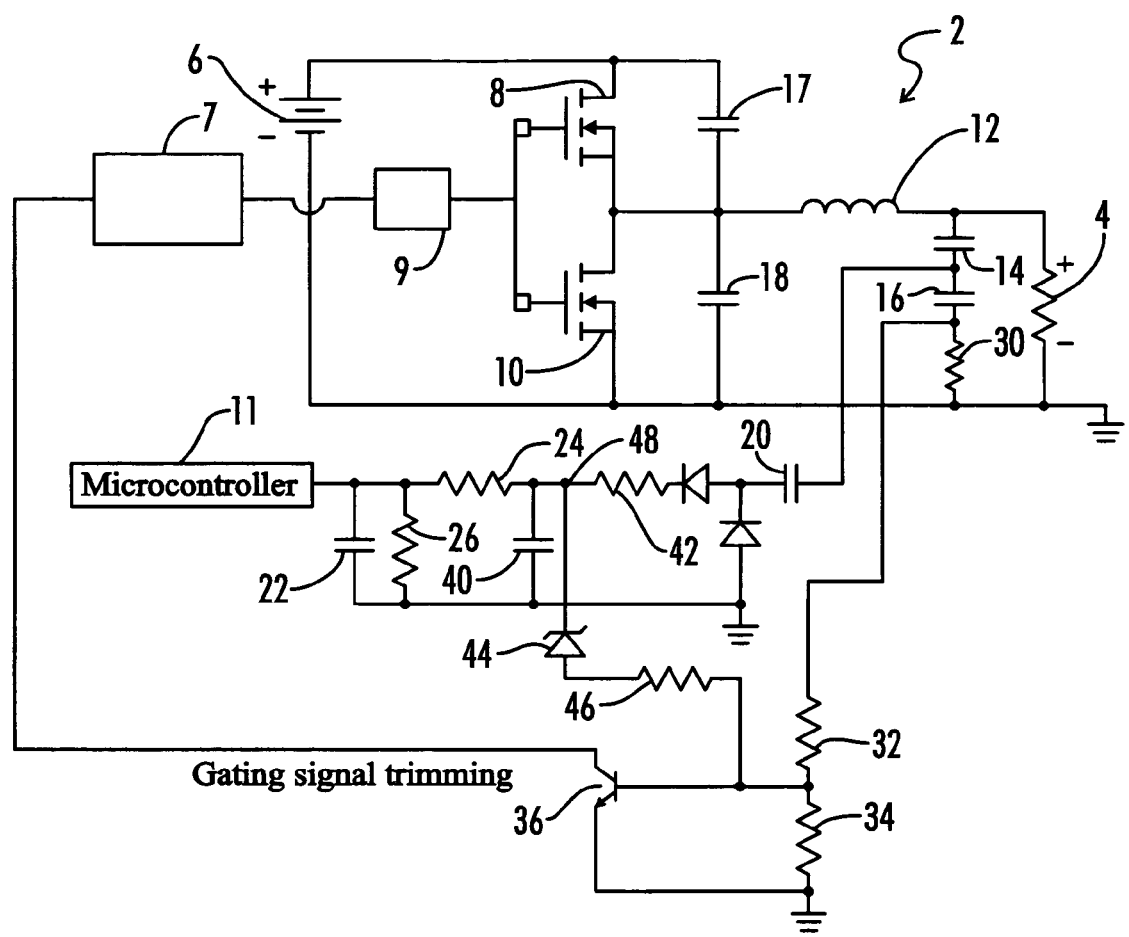
FIG. 3 is a schematic of a lossless lamp voltage sensing circuit including a cable compensation circuit constructed in accordance with a preferred embodiment of the present invention.

Capacitor sampling provides a strong sample signal with low output impedance and quick response. A cable compensation circuit is created by adding zener diode 44, resistors 42 and 46, and capacitor 40 as shown in FIG. 3. The open circuit voltage 4 as sampled by capacitor 16 rises very rapidly at node 48. When the open circuit voltage 4 becomes too high, the zener diode 44 starts to conduct and feeds current to the base of transistor 36 such that the conductive threshold for the transistor 36 is decreased. Thus, the transistor 36 starts to turn-on earlier when the voltage on resistor 30 is lower. The pulse width of the gating signal of the upper switch 8 then becomes narrower thereby reducing the open circuit voltage 4. So, the true open circuit voltage 4 is sensed in this way to change the current threshold required to turn-off the switch 8. In an exemplary circuit constructed as described above, the open circuit voltage 4 varies from 1.9 kv to 2.6 kv without the cable compensation circuit of FIG. 3 when 18 feet of cable is connected to or removed from the circuit.. However, with the cable compensation circuit of FIG. 3, the variation in the open circuit voltage 4 is within approximately 100V. Thus, an electronic ballast having a lossless voltage sampling and control circuit and a cable compensation circuit in accordance with the preferred embodiment of the present invention as shown in FIG. 3 represents a substantial improvement upon the prior art.

Thus, although there have been described particular embodiments of the present invention of a new and useful Lossless Circuit for Sampling of Lamp Voltage, it is not intended that such references be construed as limitations upon the scope of this invention except as set forth in the following claims.

What is claimed is:

1. An electronic ballast for producing an output voltage for igniting and powering a gas discharge lamp connected between a pair of output terminals, said ballast comprising:
    a microcontroller for controlling the ballast;
    an inverter wherein said inverter includes a first and second transistor;
    a resonant tank having a tank inductor and a tank capacitor;
    a sampling capacitor connected in series with said tank capacitor wherein said output voltage of said electronic ballast is monitored across said sampling capacitor; and
    a resistive capacitive sampling circuit for conditioning said voltage for reception by said microcontroller.

2. The electronic ballast of claim 1 further comprising a pair of snubber capacitors for reducing turn off losses in said first and second transistors wherein one of said snubber capacitors is connected in parallel with said first transistor and the other of said snubber capacitors is connected in parallel with said second transistor.

3. The electronic ballast of claim 2 wherein an extended dead time is created between gating signals of said first and second transistors to allow said snubber capacitors to discharge.

4. The electronic ballast of claim 1 further comprising an open circuit voltage control circuit that controls said output voltage when a gas discharge lamp is not connected between said output terminals.

5. The electronic ballast of claim 4 wherein said open circuit voltage control circuit comprises a resistor connected in series with said sampling capacitor and a voltage across said resistor is used to trim a gating signal for at least one of said first and said second transistors.

6. The electronic ballast of claim 1 further comprising a cable compensation circuit that limits variations in the output voltage due to cables being connected to the output terminals of the ballast.

7. An electronic ballast for providing an output voltage on a pair of output terminals for use in powering a gas discharge lamp, said ballast comprising:
    an inverter circuit having a first transistor and a second transistor;
    a resonant tank having a tank capacitor;
    a sampling capacitor connected in series with said tank capacitor wherein said output voltage of said ballast is monitored by monitoring a voltage across said sampling capacitor; and
    a resistive capacitive sampling circuit for conditioning said voltage for reception by said microcontroller.

8. The ballast of claim 7 further comprising a resistive capacitive filter for filtering said voltage across said sampling capacitor such that said voltage can be received by a microcontroller for analysis.

9. The electronic ballast of claim 7 further comprising a lossless snubber circuit for reducing turn off losses in said inverter.

10. The electronic ballast of claim 7 further comprising an open circuit voltage control circuit that controls a voltage across said output terminals of said ballast when a gas discharge lamp is not connected between said output terminals.

11. The electronic ballast of claim 10 wherein said open circuit voltage control circuit includes a resistor connected in series with said sampling capacitor.

12. The electronic ballast of claim 7 further comprising a cable compensation circuit for compensating for changes in said output voltage due to a cable being connected to said output terminals.

13. The electronic ballast of claim 12 wherein said cable compensation circuit compensates for changes in the output voltage by altering gating signals of at least one of said transistors.

14. An electronic ballast having a pair of output terminals for providing power to a gas discharge lamp, said ballast comprising:
    a microcontroller for controlling said ballast;
    a half-bridge inverter circuit including a pair of series connected transistors;

a resonant tank circuit connected between said series connected transistors wherein said resonant tank circuit includes a resonant inductor connected in series with a resonant capacitor;

a sampling capacitor connected in series with said resonant capacitor wherein a voltage across said sampling capacitor is proportional to a voltage across said output terminals; and a resistive capacitive sampling circuit for conditioning said voltage across said sampling capacitor for reception by said microcontroller.

15. The electronic ballast of claim 14 wherein said microcontroller monitors said voltage across said sampling capacitor.

16. The electronic ballast of claim 15 further comprising a resistive and capacitive filter for filtering the sampled voltage across the sampling capacitor before the sampled voltage is provided to the microcontroller.

17. The electronic ballast of claim 14 further comprising a resistor connected in series with said sampling capacitor wherein a voltage across said resistor is used to control an open circuit output voltage of said electronic ballast.

18. The electronic ballast of claim 17 further comprising an open circuit voltage control circuit wherein said open circuit voltage control circuit produces a transistor gating signal based upon said voltage across said resistor that is used by said microcontroller to control said output voltage.

19. The electronic ballast of claim 14 further comprising a cable compensation circuit that limits variations in an output voltage due to cables being connected to outputs of the ballast.

20. The electronic ballast of claim 19 wherein said cable compensation circuit limits variations in the output voltage by providing signals to the microcontroller that are used to alter the turn-on times of at least one of said pair of transistors.

* * * * *